(12) United States Patent
Shorter et al.

(10) Patent No.: US 11,403,558 B1
(45) Date of Patent: Aug. 2, 2022

(54) GXP ARTIFICIAL INTELLIGENCE / MACHINE LEARNING (AI/ML) PLATFORM

(71) Applicant: IQVIA Inc., Danbury, CT (US)

(72) Inventors: Gary Shorter, Danbury, CT (US); Malcolm Postings, Danbury, CT (US); Kevin T. Saylor, Danbury, CT (US)

(73) Assignee: IQVIA INC., Danbury, CT (US)

( * ) Notice: Subject to any disclaimer, the term of this patent is extended or adjusted under 35 U.S.C. 154(b) by 497 days.

(21) Appl. No.: 16/511,251

(22) Filed: Jul. 15, 2019

Related U.S. Application Data

(60) Provisional application No. 62/732,596, filed on Sep. 18, 2018.

(51) Int. Cl.
| | |
|---|---|
| *G06N 20/00* | (2019.01) |
| *G06F 8/60* | (2018.01) |
| *G06Q 30/00* | (2012.01) |
| *G06F 30/27* | (2020.01) |
| *G06N 3/08* | (2006.01) |

(52) U.S. Cl.
CPC ............ *G06N 20/00* (2019.01); *G06F 8/60* (2013.01); *G06F 30/27* (2020.01); *G06N 3/08* (2013.01); *G06Q 30/018* (2013.01); *H04L 2209/38* (2013.01)

(58) Field of Classification Search
CPC .. G06N 20/00; G06N 3/08; G06F 8/60; G06F 30/27; G06Q 30/018; H04L 2209/38
See application file for complete search history.

(56) References Cited

U.S. PATENT DOCUMENTS

| | | | | |
|---|---|---|---|---|
| 2017/0124487 | A1* | 5/2017 | Szeto | G06N 20/00 |
| 2018/0189797 | A1* | 7/2018 | Ravi | G06F 21/552 |
| 2018/0333083 | A1* | 11/2018 | Orellano | G16H 50/30 |
| 2019/0156247 | A1* | 5/2019 | Faulhaber, Jr. | G06N 20/00 |

(Continued)

OTHER PUBLICATIONS

European Commission, "Ethics Guidelines for Trustworthy AI: High-Level Expert Group on Artificial Intelligence" Brussels, Apr. 8, 2019 (41 pages total).

(Continued)

*Primary Examiner* — Arvin Eskandarnia
*Assistant Examiner* — Chhian (Amy) Ling
(74) *Attorney, Agent, or Firm* — John Maldjian; Jonathan David; Stevens & Lee PC

(57) ABSTRACT

A GxP (good practice) platform is implemented to enable artificial intelligence (AI) algorithms to be tracked from creation through training and into production. Deployed algorithms are assigned a GxP chain ID that enables identification of production details associated with respective algorithms. Trained algorithms, each of which are respectively associated with a GxP chain ID, are containerized and can be utilized through an application programing interface (API) to provide a service. The GxP chain ID is linked to production details stored within a database, in which the production details can include information such as data used to train the algorithm, a history version, a date/time stamp when the algorithm was validated, software and hardware on which the algorithm was developed and trained, among other details. Changes to the algorithm can be tracked using an immutable ledger facilitated by the implementation of blockchain.

22 Claims, 16 Drawing Sheets

(56) References Cited

U.S. PATENT DOCUMENTS

2020/0042982 A1* 2/2020 Snow .................. G06Q 20/367
2021/0287297 A1* 9/2021 Hayward ............. G06V 30/274

OTHER PUBLICATIONS

OECD, "Recommendation of the Council on Artificial Intelligence", OECD/LEGAL/0449, 2019 (12 pages total).
FDA, U.S. Food & Drug Administration, "Proposed Regulatory Framework for Modifications to Artificial Intelligence/Machine Learning (AI/ML)-Based Software as a Medical Device (SaMD)", Apr. 2, 2019 (20 pages total).

* cited by examiner

1700

US 11,403,558 B1

GXP ARTIFICIAL INTELLIGENCE / MACHINE LEARNING (AI/ML) PLATFORM

CROSS-REFERENCE TO RELATED APPLICATION

This application claims the benefit of U.S. Provisional Application Ser. No. 62/732,596 filed on Sep. 18, 2018, the entire content of which is hereby incorporated by reference in its entirety.

BACKGROUND

Artificial intelligence (AI) algorithms are typically manufactured with little to no formality nor standard operating procedures, which makes control and audit trails difficult to assess. Furthermore, an AI algorithm's ability to learn, develop, and improve operations over time is fundamental to its precision and accuracy, but failing to understand how these developments transpired can lead to speculation over the algorithm's output and why an industry engaged in a particular action.

SUMMARY

A fully compliant end-to-end GxP (good practice) platform is implemented to enable tracking and documentation of learning improvements of an AI algorithm through its life cycle, from development to validation and production. The GxP platform enables a user to explain, at any time, the precise forensic knowledge on how algorithms have been created, trained, and deployed within an organization and across organizational boundaries. The platform includes a training environment which uses specific datasets that are recorded and identifiable using a GxP chain identifier (ID).

The GxP platform is configured to track and log information from the initial development of the algorithm, training the algorithm, and through production of the algorithm, including any further refinements of the algorithm post-production. After the initial development, the AI algorithm is trained through a training environment using, for example, batch, online, in-memory, or authorized third-party remote client data.

Once the algorithm has been trained, it can be validated, moved to production (e.g., the algorithm can be live and available within a client environment), and assigned a GxP chain ID which identifies production details about the algorithm, including hardware and software on which the algorithm was tested, a version number, data identification, date and time stamps, a history of versions for the algorithm, and legal details about the algorithm, among other details. The GxP chain ID enables identification of the production details that are stored in a database associated with one or more servers or other computing devices on which the GxP platform operates. Companies can track details about the algorithm to explain how or why the algorithm acted in a certain way, such as provided a given output. Algorithms can be containerized, individually or collectively with other algorithms, in a single application programming interface (API) that is deployed for a given service. Each respective algorithm is given its own GxP chain ID to enable individualized tracking and identification of details of the respective algorithm's life cycle.

The end-to-end industry compliant GxP platform for AI and machine learning algorithms provides an integrated approach that covers development, testing, validation, training, and execution of the algorithm. Data scientists can utilize this single platform to individually and collectively develop algorithms under which the necessary compliance guidelines are built. Benefits can be realized internally from the use of algorithms in existing systems and production work, which provides real world efficiency gains, quality improvements, and cost savings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
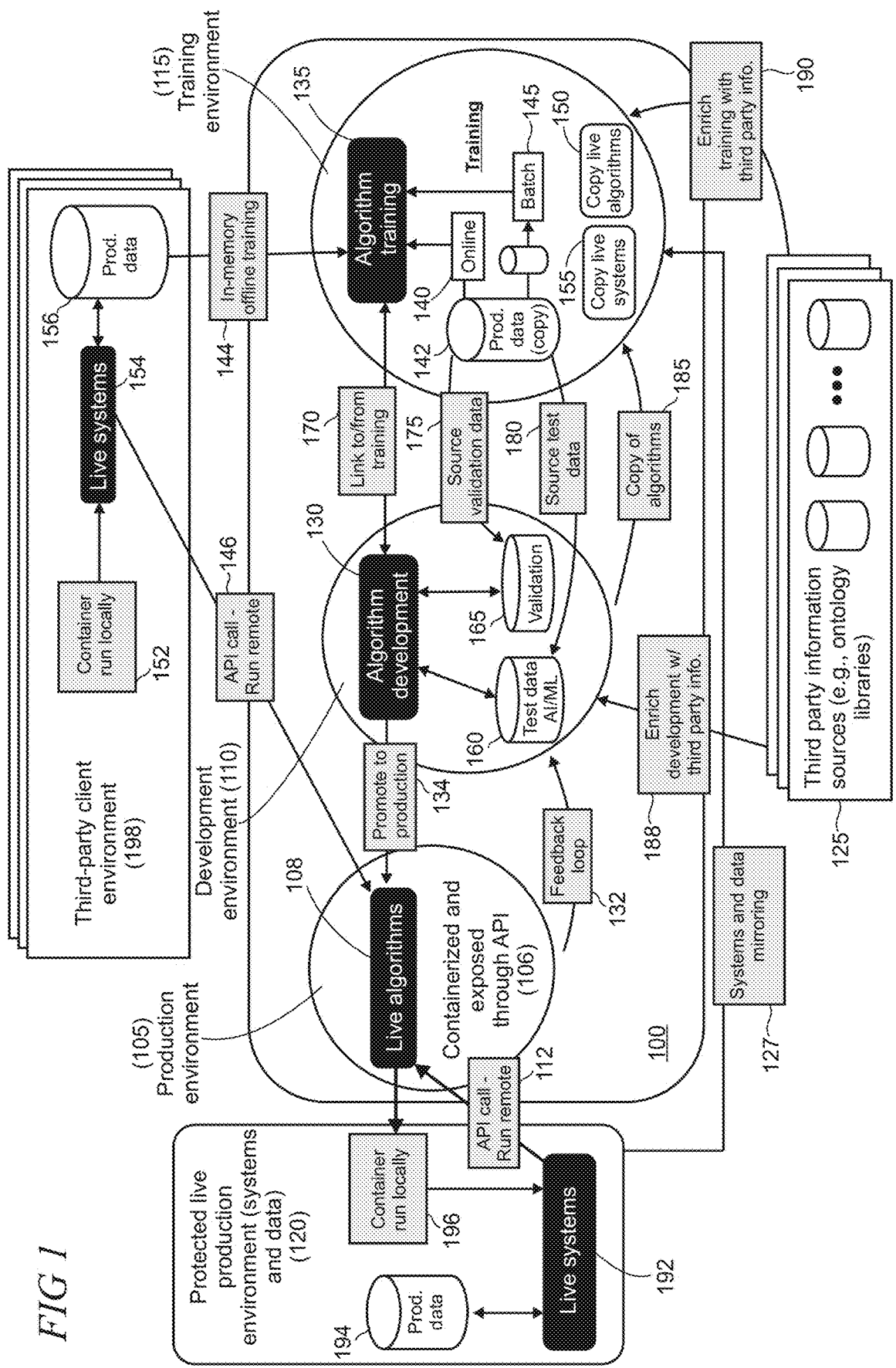
FIG. 1 shows a GxP (good practice) platform which contains multiple illustrative environments.

FIG. 1 shows an illustrative diagram in which multiple environments are implemented which collectively make up the GxP (good practice) platform 100. The GxP platform is configured to integrate the processes performed by multiple environments when creating an artificial intelligence (AI)/machine learning (ML) algorithm (individually and collectively referred to as an "AI algorithm"). The integration of the environments enables the GxP platform to record data pertaining to the created algorithms and thereby provide a forensic-level data trail for each algorithm. The data trail can be used to determine how algorithms have been created, trained, and deployed, throughout the algorithms' life cycles, within an organization and across organizational boundaries.

The GxP platform 100 includes a production environment 105, development environment 110, and training environment 115, in which the various environments may interact with other environments including a protected live production environment 120, third-party client environment 198, and third party information sources environment 125.

Turning first to the development environment 110, algorithm development 130 is performed in which the structure of an initial AI algorithm is developed for a given implementation and purpose. Structures of a model for an AI algorithm may vary based on pre-processing requirements, scalability, the number of features used for training, the type of data utilized, the type of model (e.g., regression model or decision tree), etc.

The development environment may be linked to and from the training environment 115, as representatively shown by numeral 170. The training environment receives a copy of the developed AI algorithm, as representatively shown by numeral 185. The developed AI algorithm can go through algorithm training 135 using a copy of the production data 142 such as online data 140, batch data 145, or in-memory data 144. The online data may be data that is retrieved from external memory sources, such as from a particular customer, and in-memory data may be memory received in real time from some external source, such as from a third-party client environment 198. For example, the in-memory data can include data obtained from a sensor that is actively monitoring some biological function, like a heartbeat, associated with a patient, and the sensor, in real time, transmits the monitored data to the training environment 115. Thus, the training environment is enhanced using the integration with the live systems 154 associated with the third-party client. The live systems may operate using the software within the locally run container 152. The data utilized in the development and training environments can be enriched using third-party information retrieved from third-party information sources (e.g., ontology libraries) 125, as representatively shown by numerals 188 and 190. The training environment may also utilize a copy of live systems and live algorithms for further algorithm development, as representatively shown by numerals 150 and 155.

The trained algorithm may be utilized by the development environment 110 for algorithm validation using the AI/ML test data 160 and validation data 165. The test and validation data can be source data derived from the copy of the production data 142, as representatively shown by numerals 175 and 180. After validation, the trained algorithm is promoted, or moved, to the production environment 105, as representatively shown by numeral 134, where it is containerized and exposed through an application programming interface (API) for utilization as a live algorithm, as representatively shown by numerals 106 and 108. The container may be executed as a live system 192 within a protected live production environment (systems and data) 120, which utilizes production data 194 and the locally run container 196 which includes the one or more trained algorithms. The live system may perform an API call to the production environment which invokes the live algorithms, as representatively shown by numeral 112. The live system 154 may likewise perform an API call 146 to remotely run the trained and live algorithms operating from the production environment. The implementation of the trained algorithms can be enhanced using a feedback loop 132 and by mirroring the systems and data 127 to periodically train the algorithm using new or updated data. As discussed in greater detail below, aspects of the processes in FIG. 1 are captured and stored for each algorithm using an assigned GxP chain ID (not shown in FIG. 1).

Figure 2:
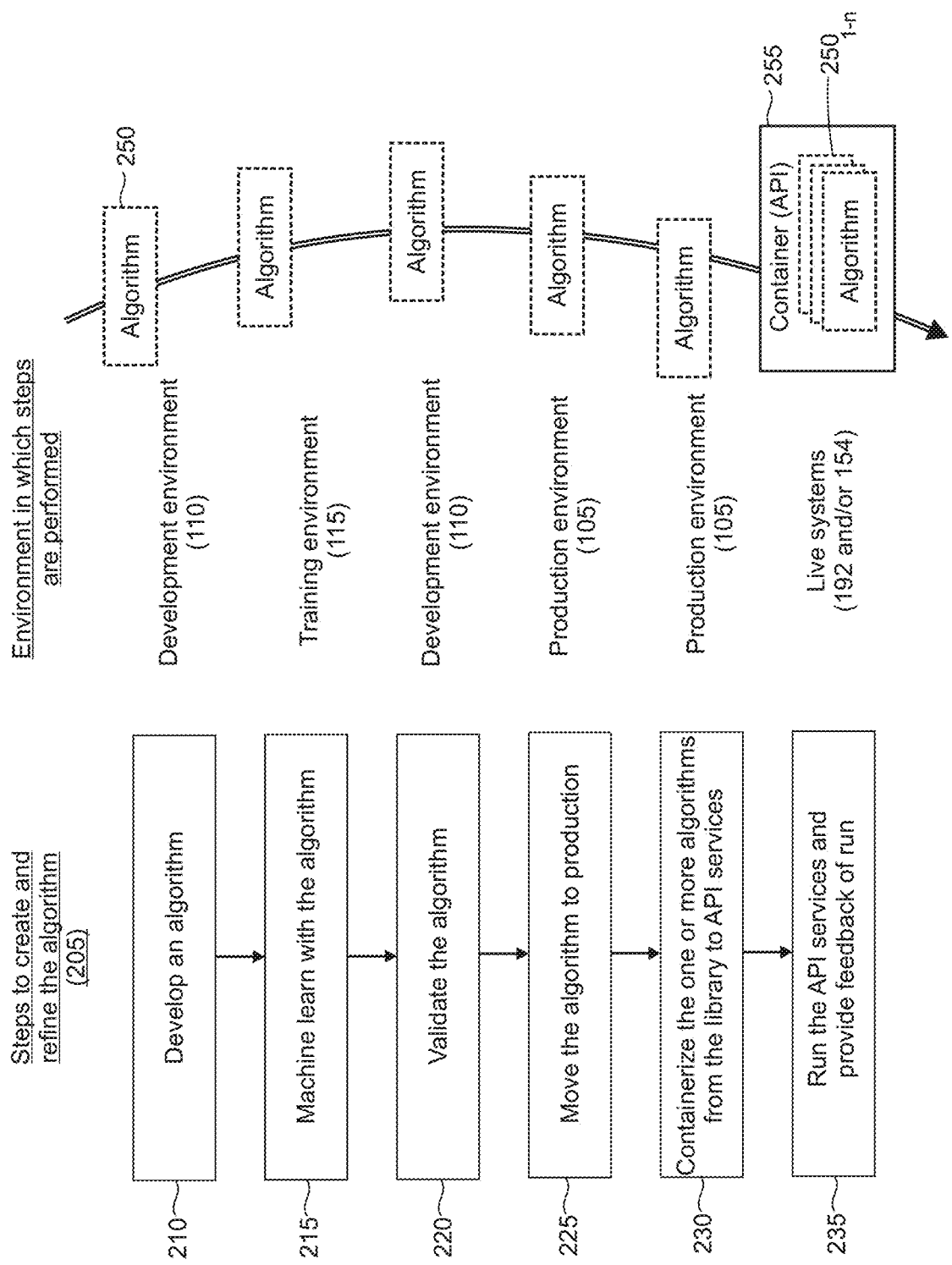
FIG. 2 shows a method of an illustrative process performed by the GxP platform.

FIG. 2 shows a simplified flowchart of an illustrative process 205 for creating and refining algorithms in the environment depicted in FIG. 1. The process includes developing the algorithm 210, machine learning with the algorithm 215 (e.g., training the algorithm), validating the algorithm 220, moving the algorithm to production 225, containerizing the one or more algorithms from the library to API services 230, and running the API services and providing feedback of the run 235. FIG. 2 shows how an algorithm 250 traverses through each of the GxP platform's environments and is placed into a container 255 for execution by a live system 192 and/or 154. The container can include one or more algorithms developed from the GxP platform 100.

Figure 5:
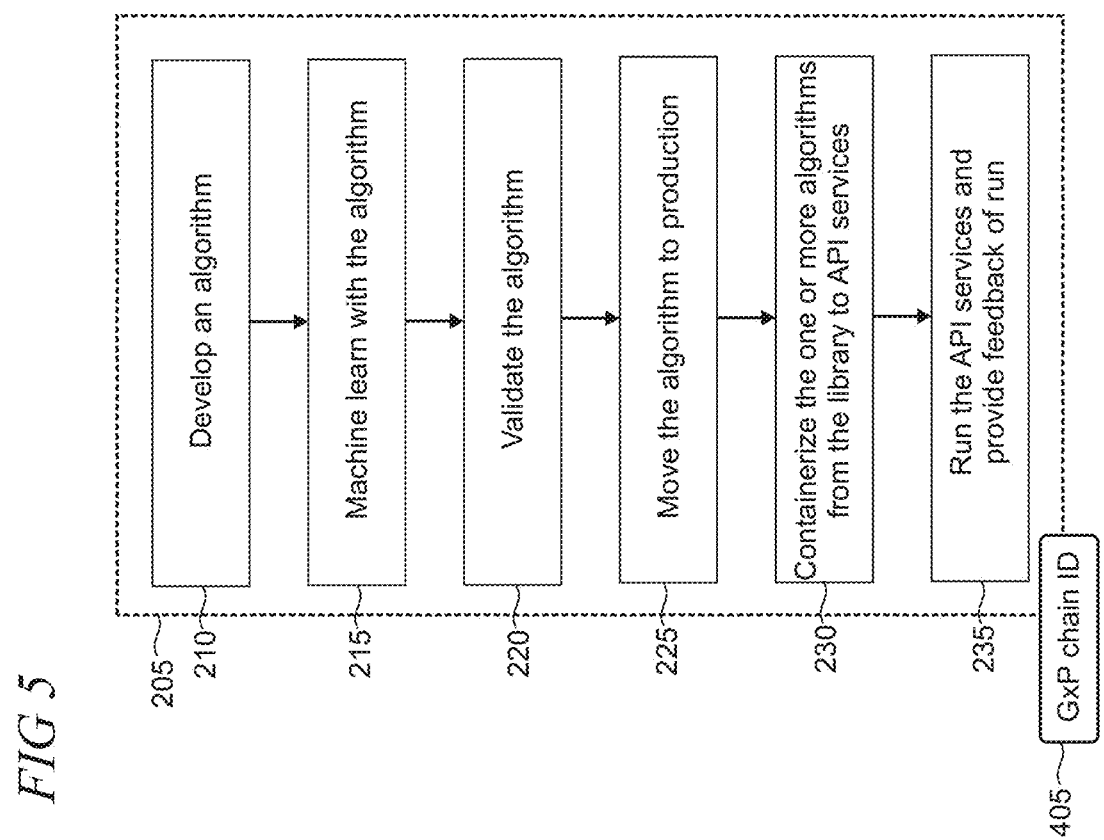
FIG. 5 shows a diagram in which the GxP chain ID representatively enables tracking of the steps in the process used to generate the algorithm.
Figure 3:
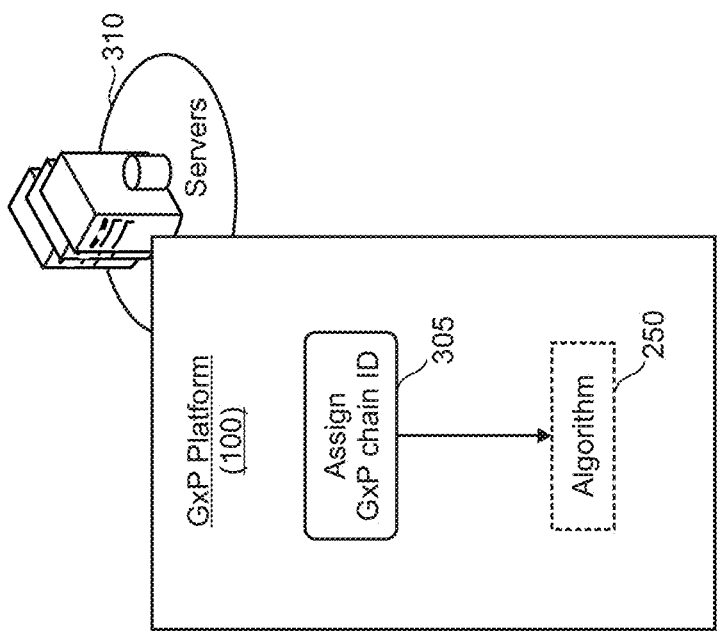
FIG. 3 shows a diagram of the GxP platform illustratively assigning a GxP chain identifier (ID) to an algorithm.
Figure 4:
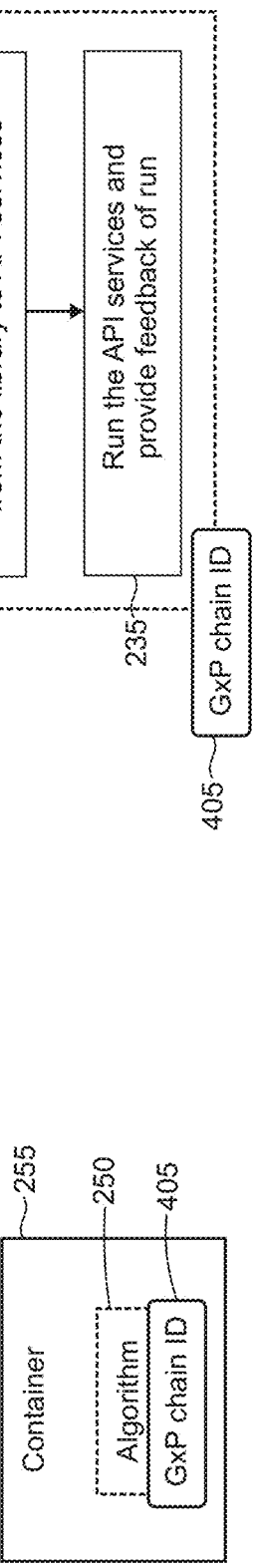
FIG. 4 shows an illustrative diagram in which the algorithm with the GxP chain ID is inside a container.

FIG. 3 shows a diagram in which the GxP platform 100, operating on servers 310, assigns a GxP chain identifier (ID) to a respective algorithm 250, as representatively shown by numeral 305. The GxP chain ID 405 is attached to the algorithm 250 when instantiated in a container 255, as shown in FIG. 4. The GxP chain ID, which may be comprised of alpha-numeric values, follows the algorithm on any implementation to enable identification of that specific algorithm and production details associated with the created algorithm. For example, FIG. 5 shows the steps to create and refine the algorithm from FIG. 2, in which the GxP chain ID 405 enables tracking and logging of the algorithm as it traversed through those steps. The GxP chain ID may be stored with some module associated with the algorithm, and various production details for that specific algorithm's GxP chain ID can be linked to and stored in a database associated with the servers 310 for reference. This way, production details for any algorithm—including different versions of the algorithm—can be tracked, logged, and referenced upon request by, for example, a regulatory agency like the Food and Drug Administration (FDA).

Figure 6:
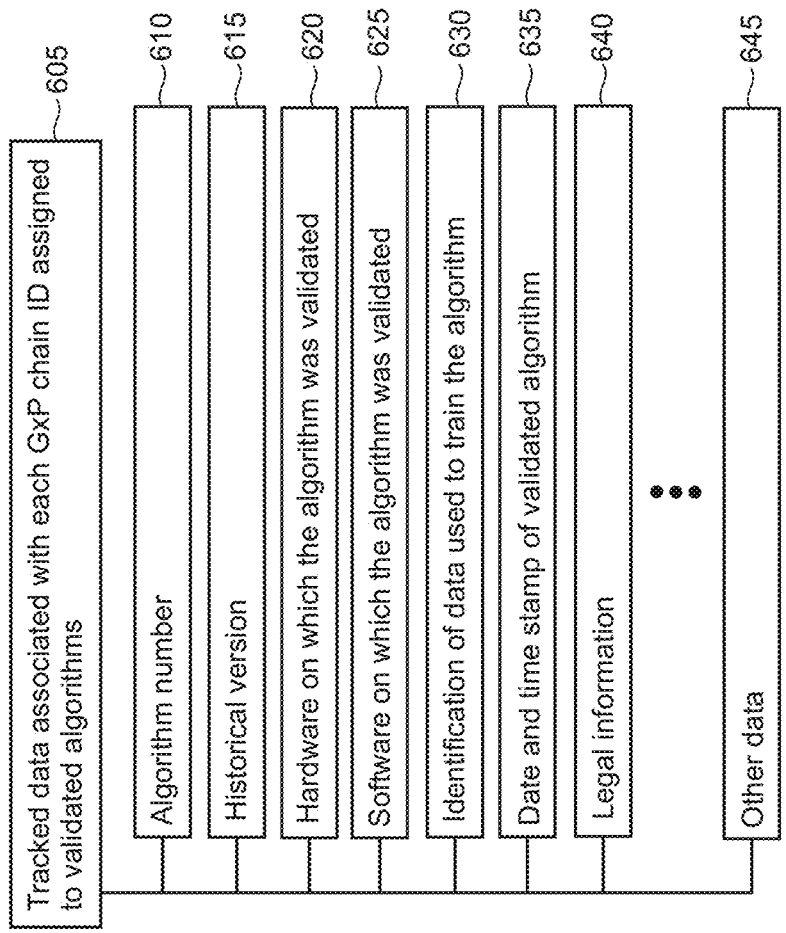
FIG. 6 shows a taxonomy of illustrative data that is tracked and associated with the GxP chain ID assigned to validated algorithms.

FIG. 6 shows a taxonomy of illustrative data that is tracked, and which is associated with the GxP chain ID assigned to validated algorithms, as representatively shown by numeral 605. Tracked data can include an algorithm number 610, historical version 615, hardware on which the algorithm was validated 620 (e.g., model and type of server, CPU (central processing unit), memory device, etc.), software on which the algorithm was validated (e.g., operating system, application used to develop, train, and create the algorithm, etc.) 625, identification of data used to train the algorithm 630, date and time stamp of validated algorithm 635, legal information 640, and other data pertaining to the algorithm's production 645.

Figure 7:
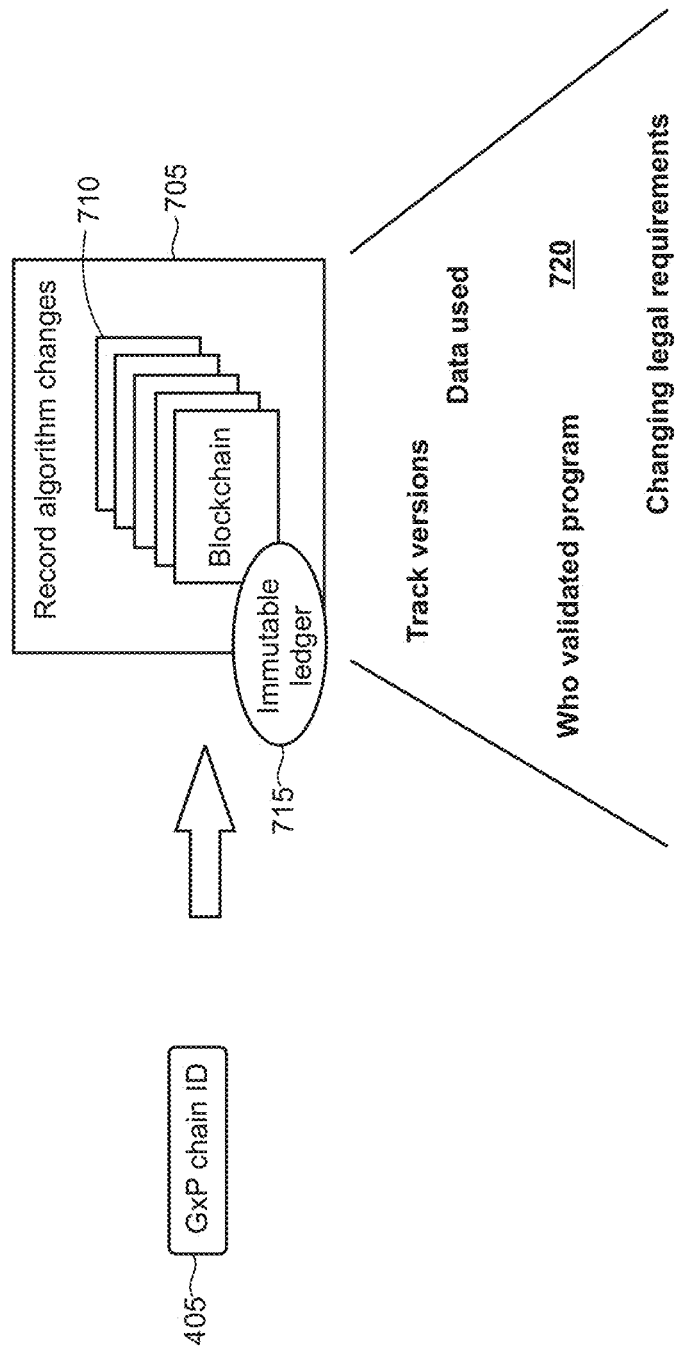
FIG. 7 shows the illustrative utilization of blockchain which provides an immutable ledger to the data associated with an algorithm.

FIG. 7 shows an illustrative environment in which the GxP chain ID 405 is utilized as a tool to reference recorded algorithm changes 705. For example, blockchains 710 can be utilized to create an immutable ledger 715 of any changes to an algorithm. Blockchain can enable tracking versions, data used, who validated a program, changing legal requirements for an algorithm, etc., as representatively shown by numeral 720. Thus, any changes to an algorithm can be identified using blockchain technology to create a decentralized digital ledger to record transactions executed against an algorithm. Future versions of the algorithm can be assigned a new GxP chain ID which identifies newest and updated versions of the algorithm, along with any production details and data as shown in FIG. 6. Thus, for example, if legal requirements are changed which affect the algorithm's operation (e.g., data retention policies, how data is handled, etc.), then the blockchain can log the changed legal requirements and algorithm's functional changes. The updated algorithm and its legal requirements can be assigned a new GxP chain ID that identifies the most recent version of the algorithm. Prior GxP chain IDs and their associated data can continue to be stored for future reference.

Figure 8:
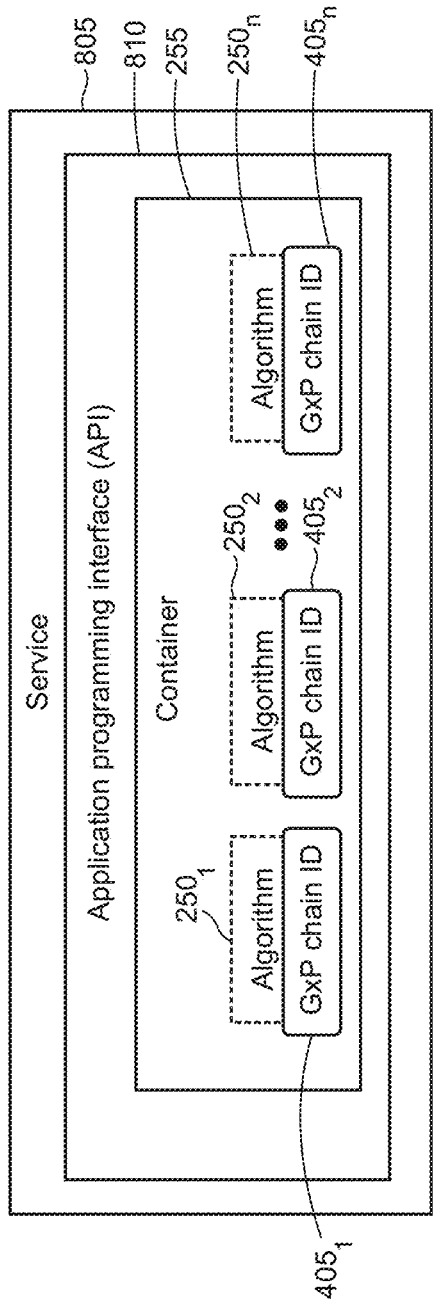
FIG. 8 shows a container in which unique GxP IDs are respectively assigned to algorithms.
Figure 9:
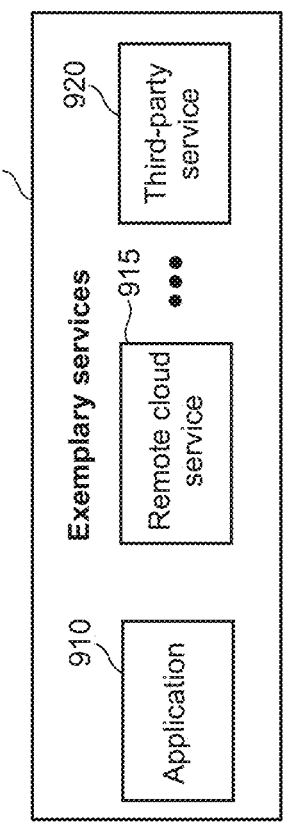
FIG. 9 shows exemplary services for which the algorithms can be utilized.

FIG. 8 shows an illustrative diagram in which a container 255 can host multiple different algorithms 250, each having its own respective GxP chain ID 405 to identify respective production details (FIG. 6). The container leverages the developed algorithms which can be utilized by an API 810 that provides some service 805, either for internal use or external customer use. Exemplary services 905 provided by the API 810, as illustratively shown in FIG. 9, can be utilized in an application 910, a remote cloud service 915, or integrated with a third-party service 920.

Figure 10:
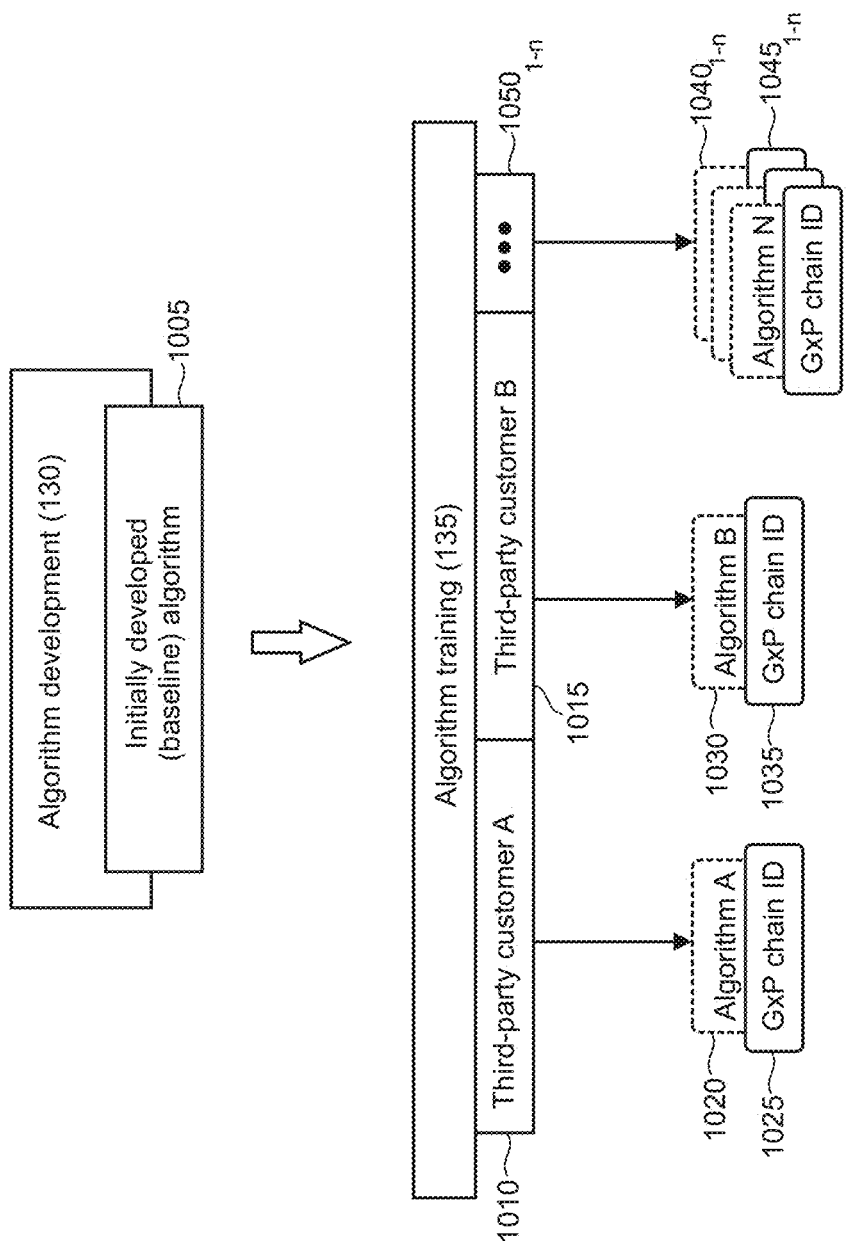
FIG. 10 shows distinct algorithms respectively having unique GxP chain IDs that are generated from a common baseline algorithm.

FIG. 10 shows an illustrative environment in which algorithms are created and developed for deployment. An initially developed (baseline) algorithm 1005 is created during algorithm development 130 in the development environment 110 (FIG. 1). The baseline algorithm 1005 is fed into the training environment 115 for algorithm training 135. Different algorithms can be produced from the training environment depending on the training data that is utilized to train the algorithm. For example, different training data can be utilized to train the algorithm for third-party customer A and third-party customer B, as representatively shown by numerals 1010 and 1015. The different data can result in the production of different algorithms, such as Algorithm A and Algorithm B, as representatively shown by numerals 1020 and 1030. Each algorithm is assigned its own GxP chain ID 1025 or 1035 for individual identification. The different production details for the algorithms are tracked using the GxP chain IDs despite both algorithms being derived from the same baseline algorithm 1005. This enables the identification of specific details about any given algorithm. Other algorithms and GxP chain IDs can be created from the baseline algorithm for other third-party customers, as representatively shown by numerals 1040, 1045, and 1050.

Figure 11:
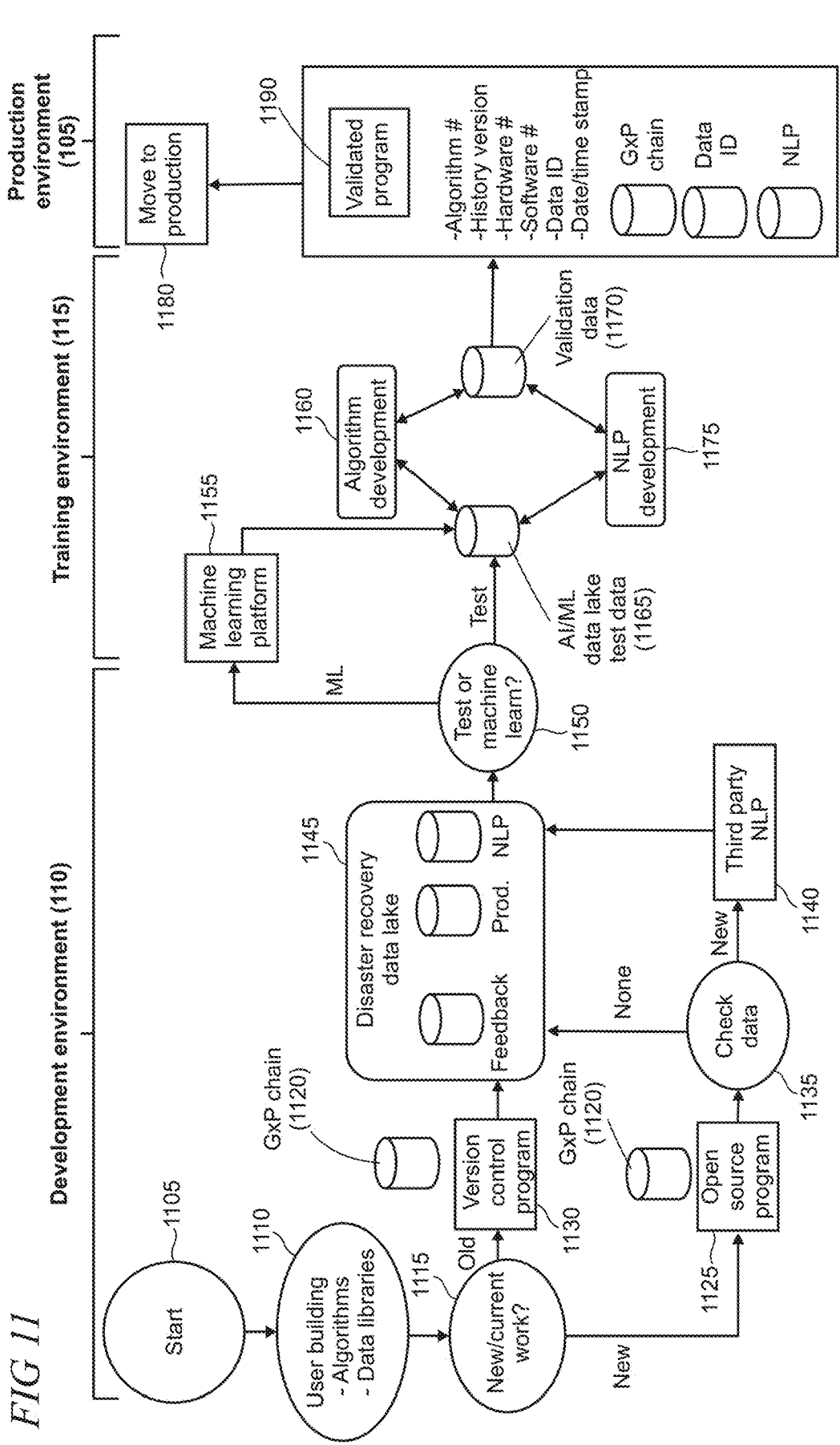
FIGS. 11-14 show exemplary processes by which algorithms are developed, trained, validated, utilized in production, and continually trained in a live systems environment.

FIGS. 11-14 show the detailed processes and steps, performed by the GxP platform 100, to develop, train, validate, place into production, and refine algorithms. Turning first to FIG. 11, which provides a high-level overview of the system, the process starts at numeral 1105. In step 1110, the user builds algorithms and data libraries in the development environment 110. In step 1115, the GxP platform assesses whether the program is newly developed or is a currently existing program that is being refined. In step 1125, a new program can potentially utilize open source programs in its development. With new programs, certain elements are established such as the algorithm's open source connection, version control of the open source program, and legal details relating to the usage of the open source program. The open source information is logged within the GxP chain data 1120, which can maintain the algorithm number, history version, and legal details about the open source programs. The data associated with the program is checked at box 1135, which can utilize the disaster recovery data lake 1145 or, if new data is present (e.g., data associated with the open source programs), third party natural language processing (NLP) data can be utilized. The data lake can be utilized as the resource for testing or training the program's algorithm.

With existing programs, a version control program 1130 is utilized to track the versions of the program. Current programs are assumed to have already been validated within the GxP platform. Updates to the program are logged in program history and a reference to the program shows the changes made to the updated version. The legal requirements for open source use can be checked, versioning of the program is applied, and an algorithm number is assigned to the program with reference to the version number. This information may all be stored within the GxP chain data 1120. The data lake 1145 can be utilized to train the existing program.

In step 1150, the GxP platform determines whether to test or train the algorithm. In step 1155, a machine learning platform is utilized to train the algorithm in the training environment 115. In step 1160, the trained algorithm goes through algorithm development during which it is trained using AI/ML data lake test data 1165 and validated using validation data 1170. In step 1175, NLP development is also performed on the algorithm to enhance the program's ability to interact with humans and process natural langue data. Although not shown, the program may be validated in the development environment 110. The validated program 1190 is then moved to production 1180 in the production environment 105. The servers on which the GxP platform operates store information pertaining to the GxP chain, data ID, and NLP data. Data ID references the location of the data used. The GxP chain data can include a GxP chain ID that identifies the production details stored and associated with the algorithm, algorithm number that notes the validation, history version information (e.g., an identification of the algorithm's version within its developmental history), hardware and software information about the system on which the algorithm was created, data ID, and a date/time stamp when validation was completed.

Figure 12:
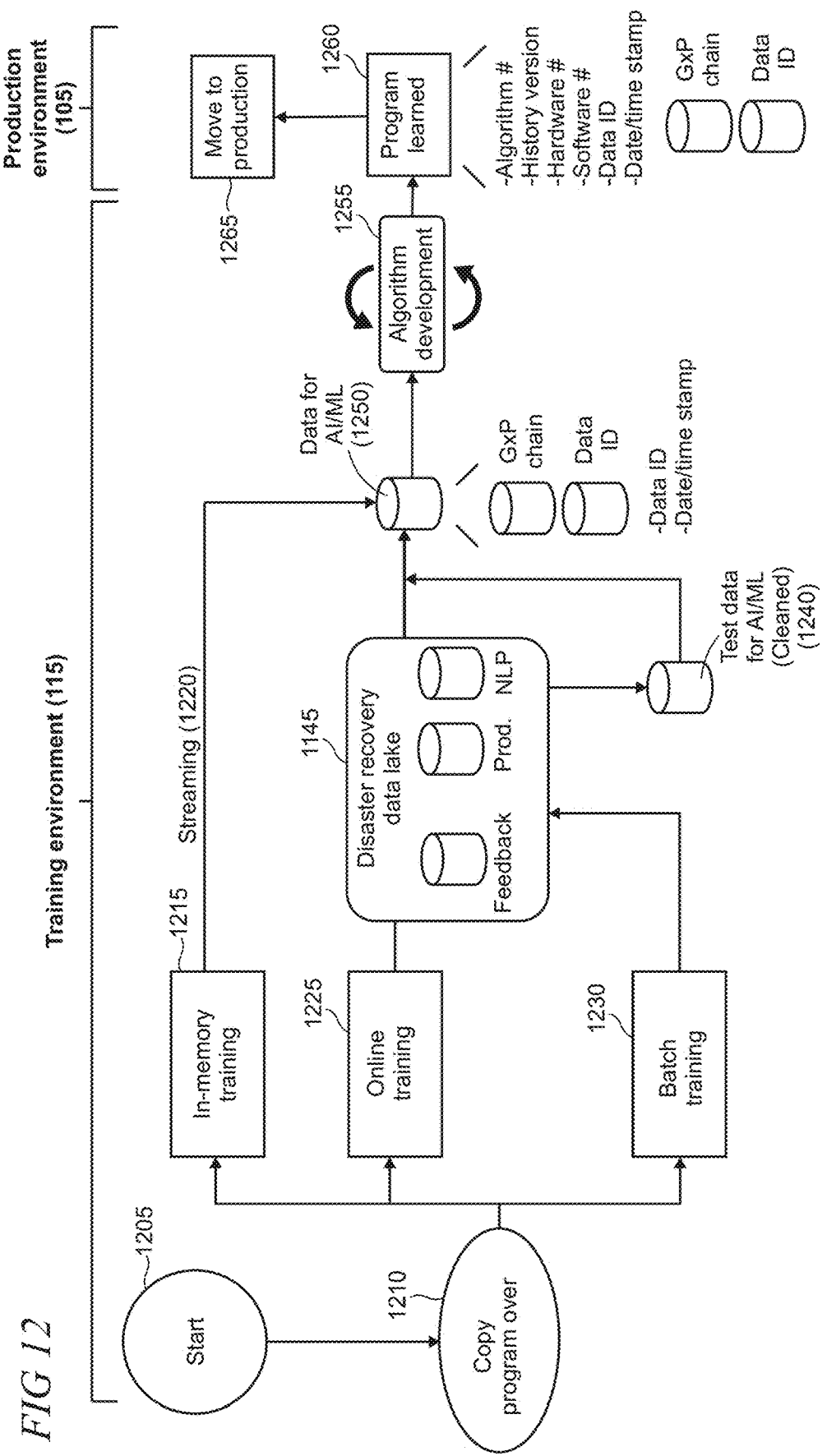

The process in FIG. 12 starts at step 1205. In step 1210, the program is copied over into the training environment 115. The program's algorithm can be trained to perform any one or more of in-memory training 1215, online training 1225, or batch training 1230. Batch and online training may be stored in the repository for the disaster recovery data lake 1145. The in-memory training 1215 is real-time data that is streamed from a remote location and utilized in real time to train the algorithm. The streamed data may include, for example, sensory data that is tracking a patient's heart activity, brain activity, or other real-time sensing of data. The data utilized to train the algorithm is fed into the database for the AWL training 1250, and, in some implementations, test data can be cleaned before utilization, as representatively shown by numeral 1240. The AI/ML data 1250 can be logged in the GxP chain and data ID to enable identification of the data set used to train the algorithm once established and deployed. The algorithm then goes through algorithm development at step 1255, during which the algorithm is trained and/or tested using the AI/ML data 1250. The program learned 1260 from the algorithm training is then moved to production 1265 in the production environment 105. The GxP chain and data ID attached to the trained program store various production details about the algorithm.

Figure 13:
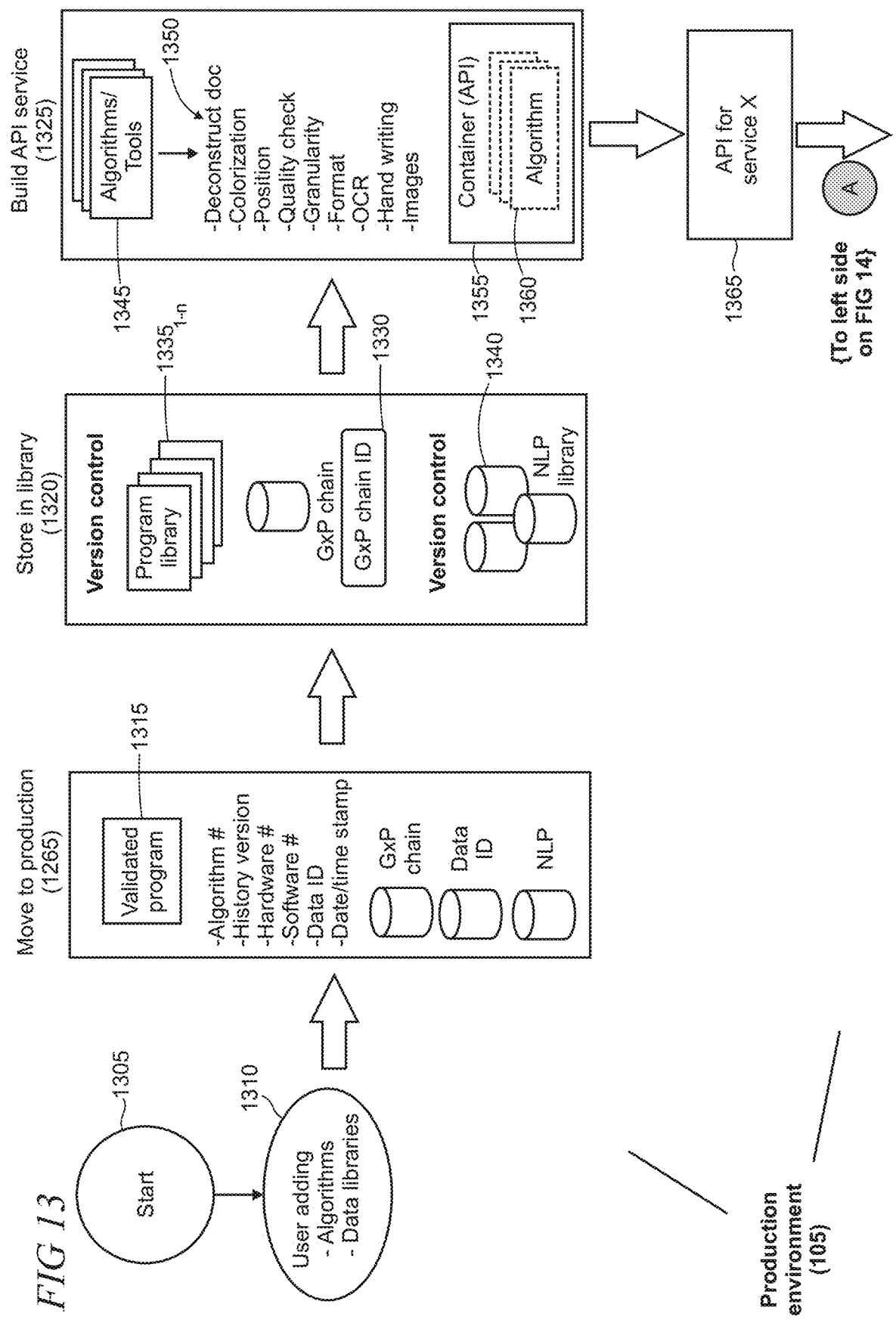

The process shown in FIG. 13 starts in step 1305 and takes place in the production environment 105. In step 1310, the user adds the algorithms and data libraries for the program which is moved to production 1265 (e.g., from FIG. 12). The validated program 1315 with its GxP chain information is stored in a library 1320 which includes a version control of programs 1335. The program may be validated, for example, when its predictive output accuracy is above some threshold percentage, such as 70% accuracy. Each program may be associated with a GxP chain ID 1330 which identifies the GxP chain data and an NLP library 1340 associated with the program. An API service is built using the program library, as representatively shown by numeral 1325. The API service is comprised of algorithms/tools 1345, exemplary ones of which are representatively shown by numeral 1350. The algorithms and tools are containerized into container 1355 which includes the algorithms 1360 for execution. The built API can be called for a given service, as representatively shown by numeral 1365. The process in FIG. 13 continues to the "A" shown in FIG. 14.

Figure 14:
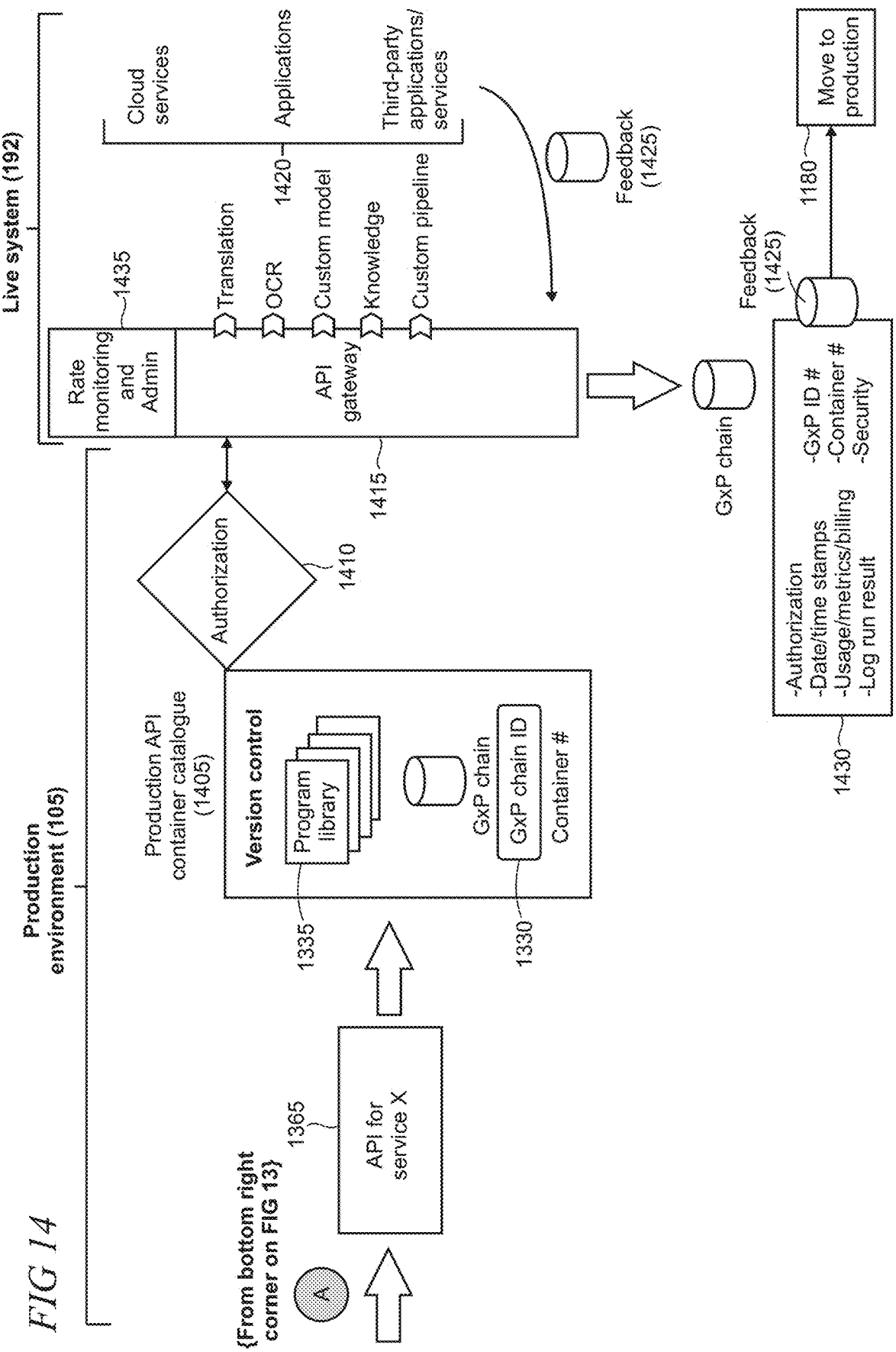

Referring to FIG. 14, authorization 1410 is given for the production API container catalogue 1405 to be executed in the live systems environment 192 through an API gateway 1415. Rate monitoring and administration 1435 may provide management functions to the API gateway. Once the algorithm is moved to the production environment for execution, the algorithm is assigned a GxP chain ID to enable identification of its associated production details stored within a database. The container in which the program is associated is provided with a container number for identification purposes. Multiple algorithms/programs and their associated GxP chain IDs can be used within a single container.

The API gateway can include various APIs for utilization, such as translation, OCR (optical character recognition), custom model, knowledge, custom pipeline, etc. The API can be utilized in various live system environments 1420, including as part of a cloud service, application, or third-party applications/services. Once the API is executed as part of a live system, feedback data 1425 can be received at the API, such as feedback on the accuracy or inaccuracy of the program's output. Any refinements to and production details about the changed algorithm, such as the details shown in box 1430, using the feedback 1425 can be tracked, logged, and moved back into production 1180 after additional training and testing based on the feedback.

The container which provides the API service records a date and time of use and logs results to indicate any issues with the respective program's execution. An exposed user interface associated with a user's computing device that accesses and uses the API monitors the use of the containers; this enables the user to view metrics associated with a container's use to assess billing and also tie each use to an algorithm number. Each algorithm number can tie back to the hardware, software, version, open-source legal details, and validation of the algorithm. The GxP platform is tied together through the use of an immutable ledger that records each level of detail separately on the GxP database through the use of blockchain (FIG. 7).

The blockchain can be located, for example, in the disaster recovery data lake so that the data is still available in case of an API failure. A separate archive can be used that relates back to the data lake. The data ID information can also be contained in a separate database that is used to identify the data source used for algorithm development without having to keep the whole set of data.

Figure 15:
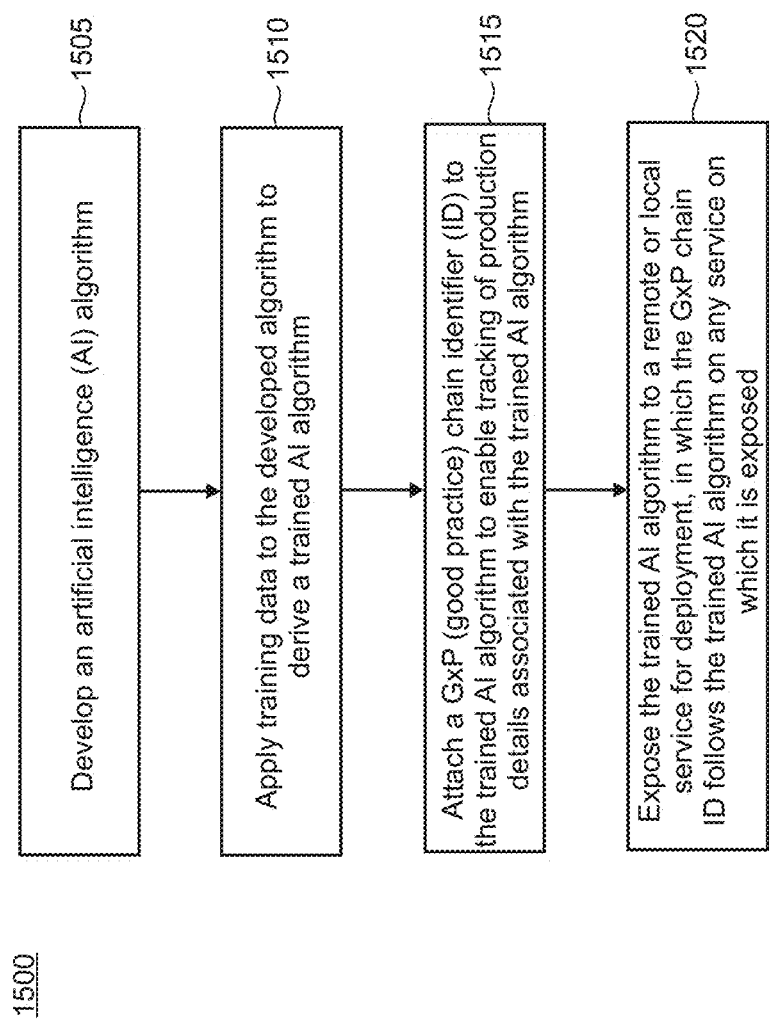
FIGS. 15-17 are flowcharts of illustrative methods performed by a computing device or server.
Figure 16:
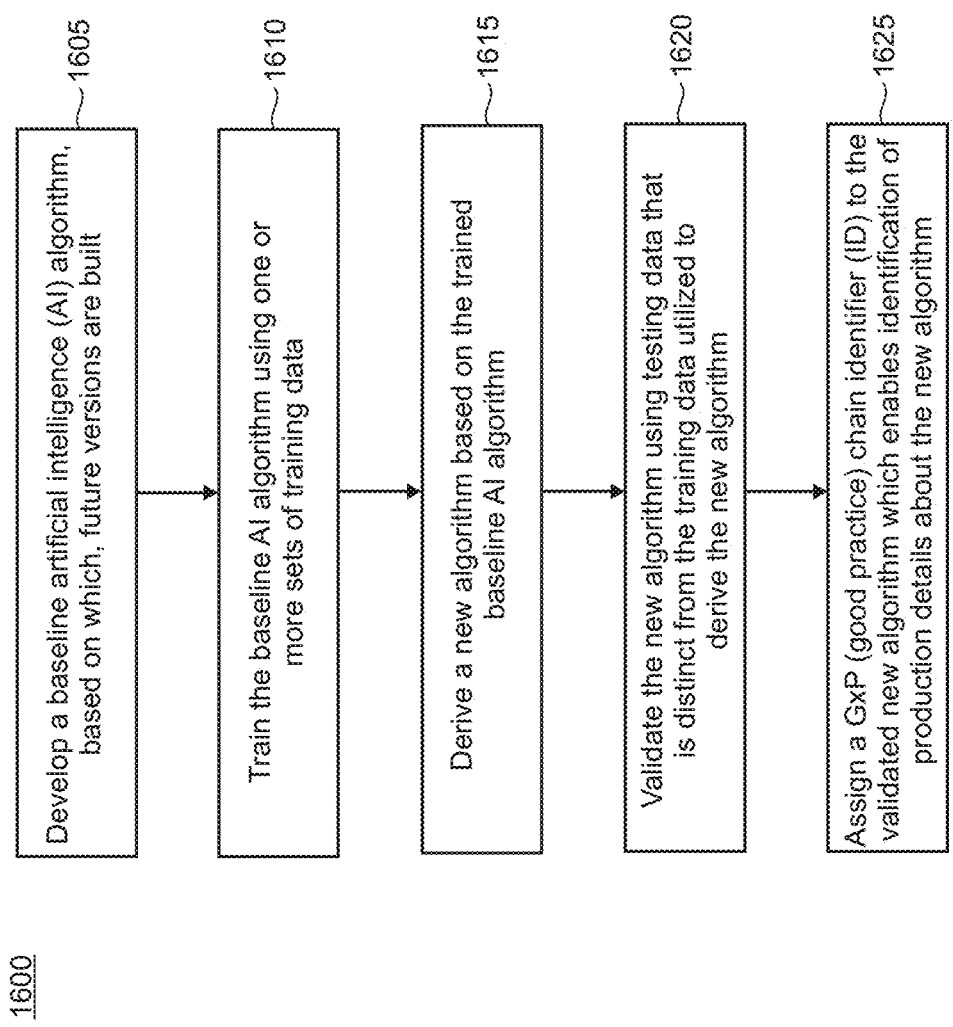
Figure 17:
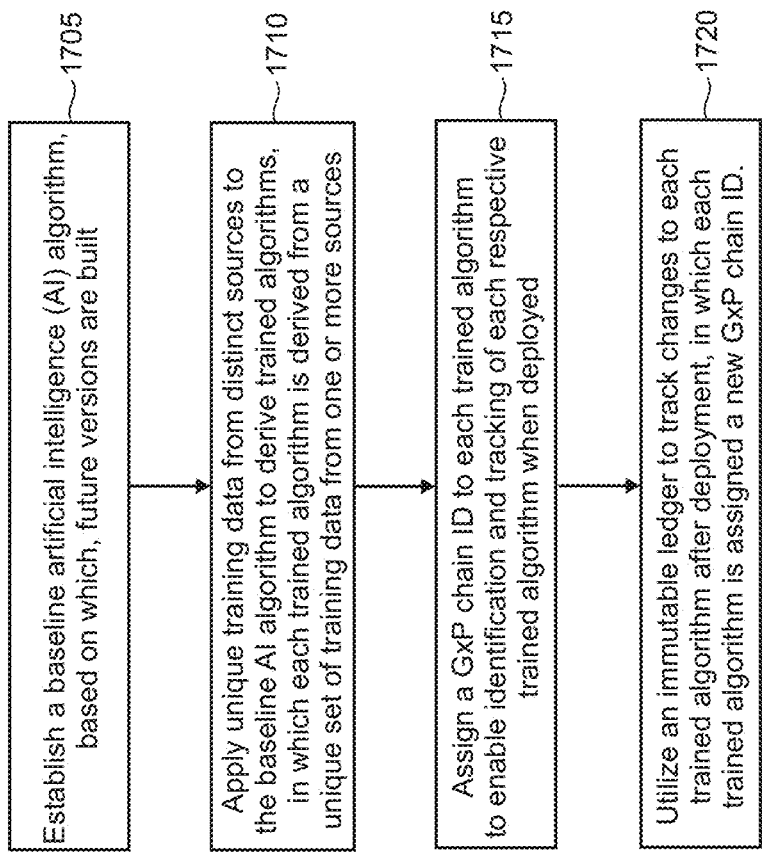

FIGS. 15-17 are flowcharts of illustrative methods 1500, 1600, and 1700, that may be performed using servers or other computing devices. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1505, in FIG. 15, a computing device develops an artificial intelligence (AI) algorithm. In step 1510, the computing device applies training data to the developed AI algorithm to derive a trained AI algorithm. In step 1515, the computing device attaches a GxP (good practice) chain identifier (ID) to the trained AI algorithm to enable tracking of production details associated with the trained AI algorithm. In step 1520, the computing device exposes the trained AI algorithm to a remote or local service for deployment, in which the GxP chain ID follows the trained AI algorithm on any service on which it is exposed.

In step 1605, in FIG. 16, a computer system develops a baseline AI algorithm, based on which, future versions are built. In step 1610, the computer system trains the baseline AI algorithm using one or more sets of training data. In step 1615, the computer system derives a new algorithm based on the trained baseline AI algorithm. In step 1620, the computer system validates the new algorithm using testing data that is distinct from the training data utilized to derive the new algorithm. In step 1625, the computer system assigns a GxP chain ID to the validated new algorithm which enables identification of production details about the new algorithm.

In step 1705, in FIG. 17, a computing device establishes a baseline AI algorithm, based on which, future versions are built. In step 1710, the computing device utilizes unique training data from distinct sources to derive trained algorithms from the baseline algorithm, in which each new algorithm is derived from a unique set of training data from one or more sources. In step 1715, the computing device assigns a GxP chain ID to each trained algorithm to enable identification and tracking of each respective trained algorithm when deployed. In step 1720, the computing device utilizes an immutable ledger to track changes to each trained algorithm after deployment, in which each trained algorithm is assigned a new GxP chain ID.

Figure 18:
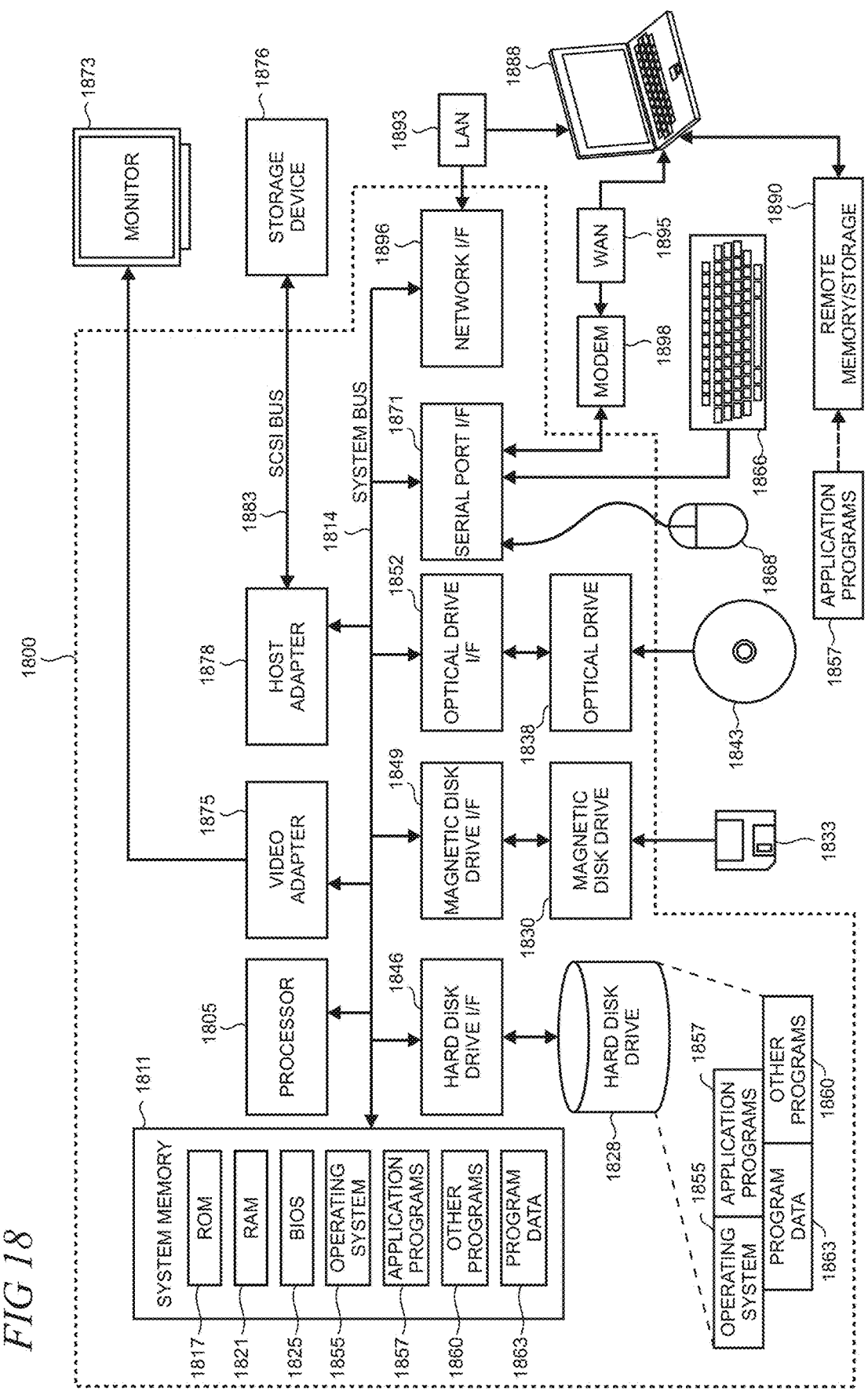
FIG. 18 is a block diagram of an illustrative architecture of a computing system such as a PC (personal computer) or server that may be used at least in part to implement the present GxP artificial intelligence/machine learning (AI/ML) platform.

FIG. 18 is a simplified block diagram of an illustrative architecture of a computer system 1800 such as a PC or server with which the present GxP artificial intelligence/machine learning (AI/ML) platform may be implemented. Computer system 1800 includes a processor 1805, a system memory 1811, and a system bus 1814 that couples various system components including the system memory 1811 to the processor 1805. The system bus 1814 may be any of several types of bus structures including a memory bus or memory controller, a peripheral bus, or a local bus using any of a variety of bus architectures. The system memory 1811 includes read only memory (ROM) 1817 and random-access memory (RAM) 1821. A basic input/output system (BIOS) 1825, containing the basic routines that help to transfer information between elements within the computer system 1800, such as during startup, is stored in ROM 1817. The computer system 1800 may further include a hard disk drive 1828 for reading from and writing to an internally disposed hard disk (not shown), a magnetic disk drive 1830 for reading from or writing to a removable magnetic disk 1833 (e.g., a floppy disk), and an optical disk drive 1838 for reading from or writing to a removable optical disk 1843 such as a CD (compact disc), DVD (digital versatile disc), or other optical media. The hard disk drive 1828, magnetic disk drive 1830, and optical disk drive 1838 are connected to the system bus 1814 by a hard disk drive interface 1846, a magnetic disk drive interface 1849, and an optical drive interface 1852, respectively. The drives and their associated computer-readable storage media provide non-volatile storage of computer-readable instructions, data structures, program modules, and other data for the computer system 1800. Although this illustrative example includes a hard disk, a removable magnetic disk 1833, and a removable optical disk 1843, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present GxP AI/ML platform. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and do not include waves, signals, and/or other transitory and/or intangible communication media.

A number of program modules may be stored on the hard disk, magnetic disk 1833, optical disk 1843, ROM 1817, or RAM 1821, including an operating system 1855, one or more application programs 1857, other program modules 1860, and program data 1863. A user may enter commands and information into the computer system 1800 through input devices such as a keyboard 1866 and pointing device 1868 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1805 through a serial port interface 1871 that is coupled to the system bus 1814, but may be connected by other interfaces, such as a parallel port, game port, or universal serial bus (USB). A monitor 1873 or other type of display device is also connected to the system bus 1814 via an interface, such as a video adapter 1875. In addition to the monitor 1873, personal computers typically include other peripheral output devices (not shown), such as speakers and printers. The illustrative example shown in FIG. 18 also includes a host adapter 1878, a Small Computer System Interface (SCSI) bus 1883, and an external storage device 1876 connected to the SCSI bus 1883.

The computer system 1800 is operable in a networked environment using logical connections to one or more remote computers, such as a remote computer 1888. The remote computer 1888 may be selected as another personal computer, a server, a router, a network PC, a peer device, or other common network node, and typically includes many or all of the elements described above relative to the computer system 1800, although only a single representative remote memory/storage device 1890 is shown in FIG. 18. The logical connections depicted in FIG. 18 include a local area network (LAN) 1893 and a wide area network (WAN) 1895. Such networking environments are often deployed, for example, in offices, enterprise-wide computer networks, intranets, and the Internet.

When used in a LAN networking environment, the computer system 1800 is connected to the local area network 1893 through a network interface or adapter 1896. When used in a WAN networking environment, the computer system 1800 typically includes a broadband modem 1898, network gateway, or other means for establishing communications over the wide area network 1895, such as the Internet. The broadband modem 1898, which may be internal or external, is connected to the system bus 1814 via a serial port interface 1871. In a networked environment, program modules related to the computer system 1800, or portions thereof, may be stored in the remote memory storage device 1890. It is noted that the network connections shown in FIG. 18 are illustrative and other means of establishing a communications link between the computers may be used depending on the specific requirements of an application of the present GxP AI/ML platform.

Figure 19:
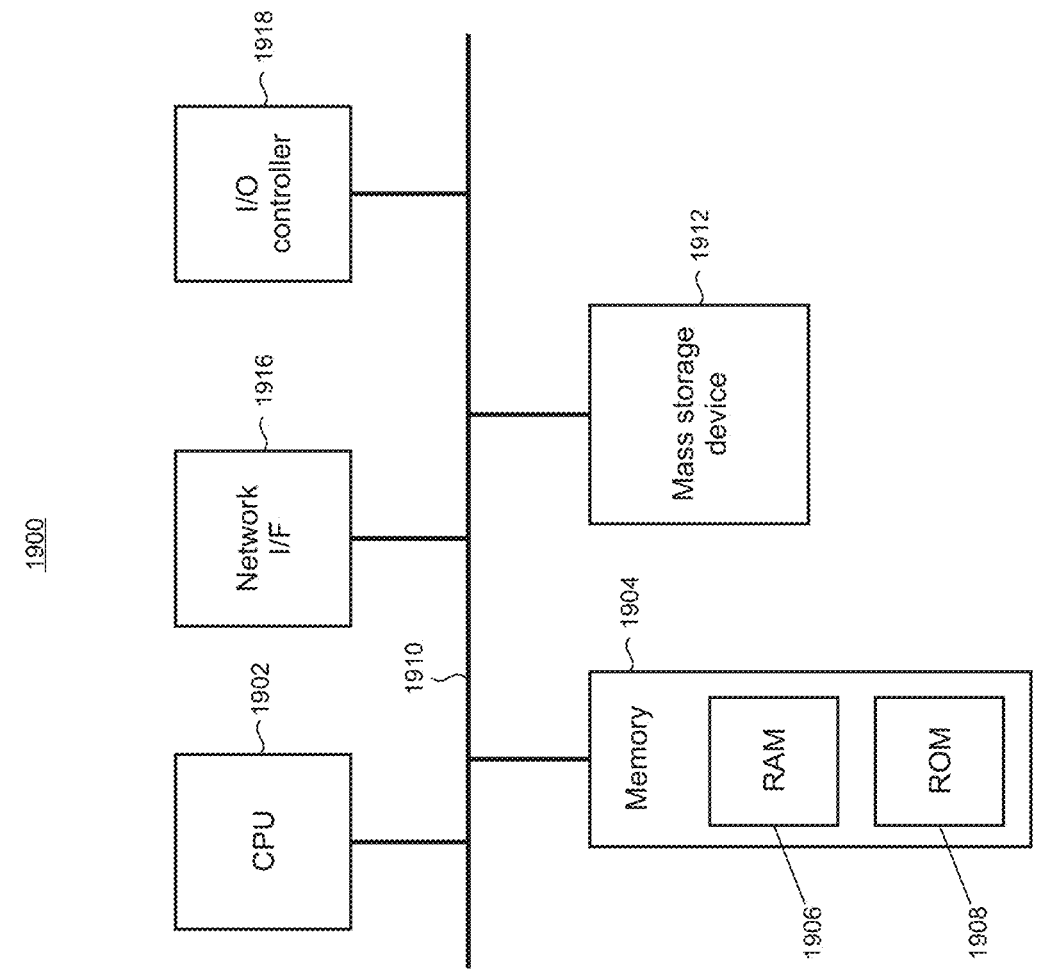
FIG. 19 is a simplified block diagram of an illustrative architecture of a computing device that may be used at least in part to implement the present GxP AI/ML platform.

FIG. 19 shows an illustrative architecture 1900 for a client computing device such as a laptop computer or personal computer for the present GxP AI/ML platform. The architecture 1900 illustrated in FIG. 19 includes one or more processors 1902 (e.g., central processing unit, dedicated Artificial Intelligence chip, graphics processing unit, etc.), a system memory 1904, including RAM (random access memory) 1906 and ROM (read only memory) 1908, and a system bus 1910 that operatively and functionally couples the components in the architecture 1900. A basic input/output system containing the basic routines that help to transfer information between elements within the architecture 1900, such as during startup, is typically stored in the ROM 1908. The architecture 1900 further includes a mass storage device 1912 for storing software code or other computer-executed code that is utilized to implement applications, the file system, and the operating system. The mass storage device 1912 is connected to the processor 1902 through a mass storage controller (not shown) connected to the bus 1910. The mass storage device 1912 and its associated computer-readable storage media provide non-volatile storage for the architecture 1900. Although the description of computer-readable storage media contained herein refers to a mass storage device, such as a hard disk or CD-ROM drive, it may be appreciated by those skilled in the art that computer-readable storage media can be any available storage media that can be accessed by the architecture 1900.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVD, HD-DVD (High Definition DVD), Blu-ray or other optical storage, magnetic cassette, magnetic tape, magnetic disk storage or other magnetic storage device, or any other medium which can be used to store the desired information and which can be accessed by the architecture 1900.

According to various embodiments, the architecture 1900 may operate in a networked environment using logical connections to remote computers through a network. The architecture 1900 may connect to the network through a network interface unit 1916 connected to the bus 1910. It may be appreciated that the network interface unit 1916 also may be utilized to connect to other types of networks and remote computer systems. The architecture 1900 also may include an input/output controller 1918 for receiving and processing input from a number of other devices, including a keyboard, mouse, touchpad, touchscreen, control devices such as buttons and switches or electronic stylus (not shown in FIG. 19). Similarly, the input/output controller 1918 may provide output to a display screen, user interface, a printer, or other type of output device (also not shown in FIG. 19).

It may be appreciated that the software components described herein may, when loaded into the processor 1902 and executed, transform the processor 1902 and the overall architecture 1900 from a general-purpose computing system into a special-purpose computing system customized to facilitate the functionality presented herein. The processor 1902 may be constructed from any number of transistors or other discrete circuit elements, which may individually or collectively assume any number of states. More specifically, the processor 1902 may operate as a finite-state machine, in response to executable instructions contained within the software modules disclosed herein. These computer-executable instructions may transform the processor 1902 by specifying how the processor 1902 transitions between states, thereby transforming the transistors or other discrete hardware elements constituting the processor 1902.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1900 in order to store and execute the software components presented herein. It also may be appreciated that the architecture 1900 may include other types of computing devices, including wearable devices, handheld computers, embedded computer systems, smartphones, PDAs, and other types of computing devices known to those skilled in the art. It is also contemplated that the architecture 1900 may not include all of the components shown in FIG. 19, may include other components that are not explicitly shown in FIG. 19, or may utilize an architecture completely different from that shown in FIG. 19.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method performed by a computing device to track algorithms throughout their life cycle, comprising:
   determining, by a good practice (GxP) platform, whether to train an artificial intelligence (AI) algorithm using a machine learning platform;
   if determined to train the baseline AI algorithm, applying training data to the developed AI algorithm to derive a trained AI algorithm;
   attaching a GxP chain identifier (ID) to the trained AI algorithm to enable tracking of production details associated with the trained AI algorithm; and
   exposing the trained AI algorithm to a remote or local service for deployment, in which the GxP chain ID follows the trained AI algorithm on any service on which it is exposed.

2. The method of claim 1, in which the applied training data is unique for a given use scenario.

3. The method of claim 2, in which the given use scenario is for a customer or a customer's implementation requirements.

4. The method of claim 1, further comprising placing the trained AI algorithm in a container for deployment in an application programming interface (API), wherein the container includes multiple trained AI algorithms each of which are respectively assigned a unique GxP chain ID.

5. The method of claim 1, in which the production details include a history version.

6. The method of claim 1, in which the production details include legal details.

7. The method of claim 1, in which the production details include software on which the trained AI algorithm was developed and trained.

8. The method of claim 1, in which the production details include hardware on which the trained AI algorithm was developed and trained.

9. The method of claim 1, in which the production details include a timestamp as to when the trained AI algorithm was validated, the timestamp including a date and time.

10. The method of claim 1, in which the production details include an identification of data utilized to train the AI algorithm.

11. The method of claim 1, in which the production details include an identification of the developed AI algorithm on which the trained AI algorithm is based.

12. The method of claim 1, further comprising utilizing an immutable ledger to track changes to the trained AI algorithm after deployment, in which a new GxP chain ID is assigned to the changed AI algorithm.

13. The method of claim 1, wherein the trained AI algorithm's ability to interact with humans is enhanced.

14. The method of claim 1, wherein the GxP platform determines whether to test the AI algorithm.

15. A computer system to track and identify an artificial intelligence (AI)-driven application operating using an algorithm, comprising:
   one or more processors; and
   one or more hardware-based non-transitory computer-readable memory devices storing instructions which, when executed by the one or more processors, cause the computer system to:

determine, by a good practice (GxP) platform, whether to train a baseline AI algorithm using a machine learning platform;

if determined to train the baseline AI algorithm, train the baseline AI algorithm using one or more sets of training data;

derive a new algorithm based on the trained baseline AI algorithm;

validate the new algorithm using testing data that is distinct from the training data utilized to derive the new algorithm; and assign a GxP chain identifier (ID) to the validated new algorithm, in which the GxP chain ID enables identification of production details about the new algorithm including at least a version number of the new algorithm and available history versions for the new algorithm.

16. The computer system of claim 15, in which the sets of training data used to train the baseline AI algorithm include in-memory training data which is streamed in real time from a source that gathers the data.

17. The computer system of claim 16, in which the source of the in-memory training data is derived from one or more sensors which gather real-time data of a subject or environment.

18. The computer system of claim 15, in which the sets of training data used to train the baseline AI algorithm include batch training data.

19. The computer system of claim 15, in which the sets of training data used to train the baseline AI algorithm include online training data derived from one or more external sources.

20. The computer system of claim 18, in which an external source for the training data is from a remote service associated with a customer for whom the new algorithm is designed.

21. One or more hardware-based non-transitory computer-readable memory devices storing computer-readable instructions which, when executed by one or more processors operatively coupled to one or more memory devices inside a computing device, cause the computing device to:

determine, by a good practice (GxP) platform, whether to train a baseline artificial intelligence (AI) algorithm using a machine learning platform, based on which, future versions are built;

if determined to train the baseline AI algorithm, apply unique training data from distinct sources to the baseline AI algorithm to derive trained algorithms, in which each trained algorithm is derived from a unique set of training data from one or more sources of the distinct sources;

assign a GxP chain identifier (ID) to each trained algorithm to enable identification and tracking of each respective trained algorithm when deployed, in which the GxP chain ID provides a link to stored production details about the trained algorithms including the respective training data from which they were derived; and utilize an immutable ledger to track changes to each trained algorithm after deployment, in which each change to a trained algorithm is assigned a new GxP chain ID.

22. The one or more hardware-based non-transitory computer-readable memory devices of claim 21, in which the executed instructions further cause the computing device to containerize a trained algorithm with one or more additional algorithms for deployment in an application programming interface (API), in which the assigned GxP chain ID tracks the containerized trained algorithm throughout its life cycle.

* * * * *